US008630646B2

United States Patent
Fersman et al.

(10) Patent No.: US 8,630,646 B2
(45) Date of Patent: Jan. 14, 2014

(54) SYSTEMS AND METHODS FOR APPLICATION CONFIGURATION IN A CLIENT DEVICE

(75) Inventors: Elena Fersman, Uppsala (SE); Göran Eriksson, Norrtalje (SE); Leonid Mokrushin, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1333 days.

(21) Appl. No.: 12/044,298

(22) Filed: Mar. 7, 2008

(65) Prior Publication Data

US 2009/0227245 A1    Sep. 10, 2009

(51) Int. Cl.
G06F 9/44 (2006.01)
H04M 3/42 (2006.01)
H04W 36/00 (2009.01)

(52) U.S. Cl.
USPC ......... 455/436; 455/414.1; 455/419; 717/100

(58) Field of Classification Search
USPC .................................................. 455/419
See application file for complete search history.

(56) References Cited

U.S. PATENT DOCUMENTS

| 6,070,070 A * | 5/2000 | Ladue ............ 455/419 |
| 6,467,019 B1 | 10/2002 | Washburn |
| 6,996,394 B2 * | 2/2006 | Minear et al. ........ 455/412.1 |
| 2006/0005156 A1 * | 1/2006 | Korpipaa et al. .......... 717/100 |
| 2007/0043695 A1 * | 2/2007 | Bare et al. ........... 707/2 |

FOREIGN PATENT DOCUMENTS

EP    1452964 A1    9/2004

OTHER PUBLICATIONS

Office Action issued on May 20, 2009 in GB Patent Application No. 0903103.0, 5 pages.

* cited by examiner

*Primary Examiner* — Charles Appiah
*Assistant Examiner* — Natasha Cosme
(74) *Attorney, Agent, or Firm* — Rothwell, Figg, Ernst & Manbeck, P.C.

(57) ABSTRACT

In one aspect, the present invention provides a method for configuring a communication device. The method may include: determining whether a triggering rule associated with a newly provisioned application (Anew) is identical to any triggering rule included in a particular set of triggering rules; and adding one or more new triggering rules to the particular set of triggering rules if it is determined that the triggering rule associated with Anew is not identical to any one of the triggering rules included in the set of triggering rules.

29 Claims, 5 Drawing Sheets

202

| Triggering Rule | Application Chain |
|---|---|
| (protocol=SIP) & (method=invite) & (field=application) | A3, A1 |
| (protocol=SIP) & (method=invite) & (field=voice) | A3, A2 |
| (protocol=SIP) & (method=invite) & NOT(field=voice) & NOT(field=application) | A3 |

202

| Triggering Rule | Application Chain |
|---|---|
| (protocol=SIP) & (method=invite) & (field=application) | A1 |

| Triggering Rule | Application Chain |
|---|---|
| (protocol=SIP) & (method=invite) & (field=application) | A1 |
| (protocol=SIP) & (method=invite) & (field=voice) | A2 |

| Triggering Rule | Application Chain |
|---|---|
| (protocol=SIP) & (method=invite) & (field=application) | A3, A1 |
| (protocol=SIP) & (method=invite) & (field=voice) | A3, A2 |
| (protocol=SIP) & (method=invite) & NOT(field=voice) & NOT(field=application) | A3 |

FIG.4

SYSTEMS AND METHODS FOR APPLICATION CONFIGURATION IN A CLIENT DEVICE

TECHNICAL FIELD

The present invention relates generally to the configuration of applications in a client device. Embodiments of the present invention relate to dynamic application configuration using triggering rules.

BACKGROUND

An operator of a telecommunication system (e.g., a wireless communication system) often desires to deploy new services for its subscribers. In some cases, to deploy new services, new applications (e.g., midlets or other applications) need to be added to the subscribers communication devices (e.g., mobile phones). Each of these applications may be designed to react to a certain request generated by or received by the communication device. Accordingly, the devices on which such a new application is installed should be configured to execute the new application when the certain request is generated or received.

However, existing solutions for JavaME midlets do not always allow for inter-midlet communication. Changing or adding a so called package within a midlet requires a re-deployment of the entire midlet. Furthermore, there is no standard mechanism to decide upon the triggering rules for deployed applications upon an incoming/outgoing request.

What is desired are systems and methods for updating the configuration of a communication device when a new application is installed on the device.

SUMMARY

In one aspect, the present invention provides an improved communication device. In some embodiments, the improved communication device includes: means for transmitting and/or receiving data; means for storing a set of applications; means for storing a set of triggering rules and for associating each the stored triggering rule with one or more of the stored applications; means for receiving a triggering rule associated with a new application; and control means for: (a) determining whether the triggering rule associated with the new application is identical to any one of the triggering rules included in the set of triggering rules and (b) adding one or more new triggering rules to the set of triggering rules if it is determined that the triggering rule associated with the new application is not identical to any one of the triggering rules included in the set of triggering rules.

The control means may be configured such that each new triggering rule added to the set of triggering rules is disjoint with respect to each other triggering rule in the set of triggering rules.

In some embodiments, the control means may be further configured to (a) determine whether the triggering rule associated with the new application is disjoint with respect to each other triggering rule included in the set of triggering rules, (b) add to the set of triggering rules the triggering rule associated with the new application ("Tnew") if it is determined that Tnew is disjoint with respect to each other triggering rule included in the set of triggering rules, and (c) associate only the new application ("Anew") with Tnew.

The control means may further be configured to add to the set of triggering rules a new triggering rule equal to (Tnew & Ti), wherein Ti was a triggering rule included in the set of triggering rules that is not disjoint with respect to Tnew and associate only Anew and Ci with the new triggering rule equal to (Tnew & Ti), wherein Ci is a set of applications that was associated with Ti.

The control means may further be configured to add to the set of triggering rules a new triggering rule equal to (NOT (Tnew) & Ti) provided that (NOT(Tnew) & Ti) would not always evaluate to FALSE, and associate only Ci with the new triggering rule equal to (NOT(Tnew) & Ti).

In some embodiments, the set of triggering rules consists of the following triggering rules (T1 . . . Tn) and the control means is further configured to add to the set of triggering rules a new triggering rule equal to (Tnew & NOT(T1) & . . . & NOT(Tn)) provided that such new triggering rule would not always evaluate to FALSE, and associate only Anew with the new triggering rule equal to (Tnew & NOT(T1) & . . . & NOT(Tn)).

In another aspect, the present invention provides a method for updating the configuration of a communication device. In some embodiments, the method includes: storing a set of applications in the communication device; storing a set of triggering rules in the communication device; associating each the stored triggering rule with a chain of one or more of the stored applications; receiving a triggering rule associated with a new application ("Anew"); determining whether the triggering rule associated with Anew is identical to any one of the triggering rules included in the set of triggering rules; and adding one or more new triggering rules to the set of triggering rules if it is determined that the triggering rule associated with Anew is not identical to any one of the triggering rules included in the set of triggering rules.

In another aspect, the present invention provides a computer program product for updating the configuration of a communication device. In some embodiments, the computer program product includes a computer readable medium storing instructions, wherein the instructions include: instructions for receiving a triggering rule associated with a new application ("Anew"); instructions for determining whether the triggering rule associated with Anew is identical to a triggering rule included in a set of triggering rules stored in the communication device; and instructions for adding Anew to a chain of applications associated with the triggering rule included in the set of triggering if it is determined that the triggering rule associated with Anew is identical to the triggering rule included in the set of triggering rules.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

FIG. 2 illustrates an exemplary dispatch table.

FIG. 3 illustrates an exemplary dispatch table.

FIG. 4 illustrates an exemplary dispatch table.

DETAILED DESCRIPTION

Figure 1:
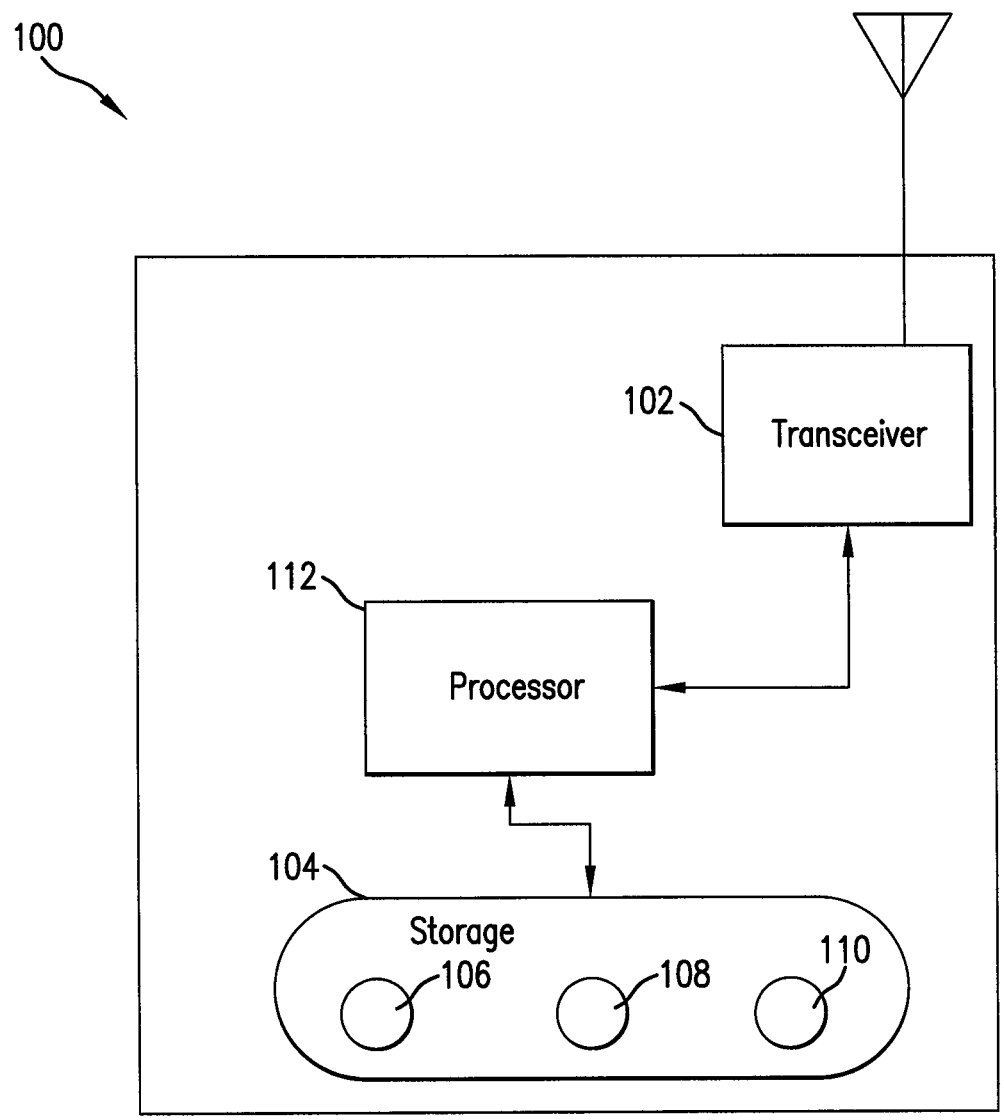
FIG. 1. is a functional block diagram illustrating a communication device according to some embodiments of the invention.

In one aspect, the present invention provides an improved communication device 100 (see FIG. 1). As illustrated in FIG.

1, communication device includes: (1) a transceiver 102 for transmitting and receiving data (e.g., requests); (2) a storage device 104 (e.g., non-volatile memory) for storing (a) applications 106, (b) application triggering rules 108, and (c) control software 110 for adding/deleting/modifying triggering rules whenever a new application is added to the device 100; and (3) a processor 112 for executing applications 106 and control software 110.

In some embodiments, each application 106 is configured to react to a certain request generated by or received by the communication device. Accordingly, one or more applications 106 may be associated with a triggering rule such that the applications are triggered whenever the triggering rule is met (e.g., whenever the triggering rule evaluates to a value of TRUE). A set of applications that is associated with a particular triggering rule is referred to as an "application chain" or "chain". For example, a spam filtering application could be triggered upon any request received by device 100. In this case the operator could choose to include the spam filter application in the beginning of all application chains.

In some embodiments, device 100 includes a dispatch table for storing triggering rules 108 and associating each triggering rule with a chain of applications 106.

Referring now to FIG. 2, FIG. 2 illustrates an exemplary dispatch table 202. As illustrated in FIG. 2, only a single application (i.e., application "A1") is deployed on device 100 and application A1 is associated with the following triggering rule: (protocol=SIP) & (method=invite) & (field=application). Given this configuration, application A1 will be executed whenever a request is received that matches the triggering rule (i.e., a request having a protocol of SIP, a method of "invite" and a field of "application."

When a new application (e.g., application A2) is deployed to device 100 and is associated with a triggering rule, the dispatch table 202 must be updated. For example, the table may be updated by simply adding the new application to an existing application chain if the trigging rule for the new application matches exactly a triggering rule already included in table 202 or the table 202 may be updated by inserting a new row into the table.

In one embodiment, it is important that all triggering rules in table 202 are disjunctive in order to keep the system deterministic, which means that not more than one triggering rule in the table 202 can match a request (incoming or outgoing). For the sake of example, assume A2 is a voice manager and its triggering rule is: (protocol=SIP) & (method=invite) & (field=voice). Because this rule does not intersect with the already existing triggering rule in table 202 (i.e., it is disjoint with respect to the existing triggering rules), when A2 is deployed to device 100 the triggering rule associated with A2 will be added to table 202, as shown in FIG. 3, which shows table 202 after deployment of A2.

Now assume that a third application A3 is a call history list application that is configured to collect the history of all incoming INVITE messages and has a triggering rule of: (protocol=SIP) & (method=invite). A3 may be given a high priority since it has to be the first application in each triggering chain to collect the information from the incoming request. When A3 is deployed to device 100, table 202 would be modified as shown in FIG. 4. As illustrated in FIG. 4, A3 has been added to the first two chains because A3's triggering rule always evaluates to TRUE whenever A2 and A1's triggering rule evaluates to TRUE. As also shown, A3 is added to the front of each chain because A3 has the highest priority. Additionally, a new row has been added to table 202 so that A3 is triggered when an incoming INVITE does not match either A1 or A2's triggering rule.

Figure 5:
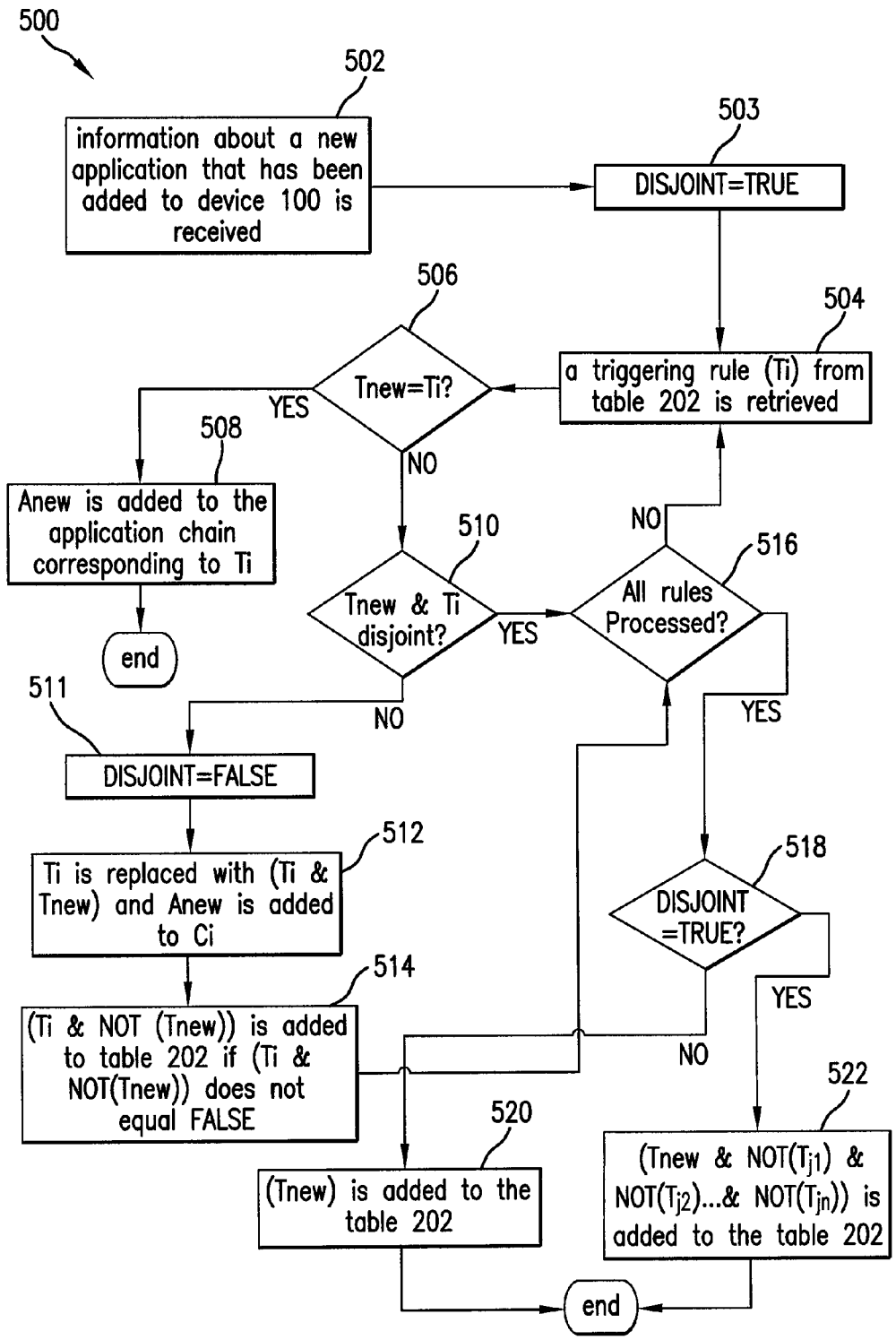
FIG. 5 is a flow chart illustrating a process according to some embodiments of the invention.

Referring now to FIG. 5, FIG. 5 is a flow chart illustrating a process 500 that may be performed by control software 110, which, as described above, may be configured to modify table 202 whenever a new application is added to device 100. Process 500 may begin in step 502, where information about a new application that has been added to device 100 is received. This information may include not only the triggering rule associated with the new application, which shall be referred to as Tnew, but also information identifying the priority of the new application. The new application shall be referred to as Anew. We shall assume that table 202 holds "n" number of triggering rules, where "n" is greater than or equal to zero (e.g., the table includes the following triggering rules: T1, T2, T3, ..., Tn). In step 503 a DISJOINT flag is set to TRUE.

In step 504, a triggering rule from table 202 is retrieved. This triggering rule shall be referred to as Ti and the application chain corresponding to Ti shall be referred to as Ci. In step 506, Ti is compared with Tnew to determine if Ti and Tnew are identical. If the rules are identical, then process 500 may proceed to step 508, otherwise it may proceed to step 510. In step 508, Anew is added to the application chain corresponding to Ti (i.e., Ci). That is, for example, Ci=Ci+Anew or Ci=Anew+Ci, depending on the priority of Anew. After step 508, process 500 may end.

In step 510, Ti is compared with Tnew to determine if the two triggering rules are disjoint. If they are disjoint, then process 500 may proceed to step 516, otherwise it may proceed to step 511. In step 511, the DISJOINT flag is set to FALSE.

In step 512, Ti is replaced with (Ti & Tnew) and Anew is added to Ci. In step 514, a new entry is added to table 202 if (Ti & NOT(Tnew)) does not equal FALSE. The triggering rule for the new entry is (Ti & NOT(Tnew)) and the application chain corresponding to the triggering rule is simply Ci. After step 514, process 500 proceeds to step 516.

In step 516 a determination is made as to whether all of the triggering rules that existed in table 202 prior to the new application being added to device 100 have been compared with Tnew. If not, then process 500 proceeds back to step 504 so that the next triggering rule can be processed. If so, then process 500 may proceed to step 518.

In step 518 a determination is made as to whether Tnew is disjoint with respect to T1, T2, T3, ..., Tn. For example, the software may check the DISJOINT flag and if the DISJOINT flag is set to TRUE then Tnew is considered to be disjoint with respect to T1, T2, T3, ..., Tn. If the Tnew is disjoint with respect to all the other triggering rules in the table, then process 500 may proceed to step 520, otherwise it may proceed to step 522.

In step 520, the following entry: (Tnew) is added to the table 202. The application chain corresponding to this new entry is simply Anew.

In step 522, the following entry: (Tnew & NOT($T_{j1}$) & NOT($T_{j2}$) ... & NOT($T_{jn}$)) is added to the table 202 provided that this expression does not equal FALSE, where $T_{j1}$-$T_{jn}$ is the set of triggering rules that are not disjoint with Tnew. The application chain corresponding to this new entry is simply Anew.

One advantage of the above method is that it provides a method for flexible configuration of dispatching rules for deployed applications and allows more than one application to be triggered upon a single request.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A communication device, comprising:
    a storage unit for storing a set of applications and a set of triggering rules, wherein each said stored triggering rule is associated with one or more of said stored applications;
    a transceiver for transmitting data and for receiving a triggering rule ("Tnew") associated with a new application ("Anew"), wherein Tnew matches a request; and
    a controller for: (a) determining whether Tnew is identical to any one of the triggering rules included in said set of triggering rules, (b) determining that Tnew is disjoint with respect to each triggering rule included in said set of triggering rules, wherein determining that Tnew is disjoint with respect to each triggering rule included in said set of triggering rules comprises determining that each triggering rule included in said set of triggering rules does not match the request, and (c) only adding Tnew to said set of triggering rules if it is determined that Tnew is not identical to any one of the triggering rules included in said set of triggering rules and is disjoint with respect to each of the triggering rules included in said set of triggering rules.

2. The communication device of claim 1, wherein the controller is configured such that each new triggering rule added to said set of triggering rules is disjoint with respect to each other triggering rule in said set of triggering rules.

3. The communication device of claim 2, wherein the controller is further configured to add to the set of triggering rules a new triggering rule equal to (Tnew & Ti), wherein Ti was a triggering rule included in said set of triggering rules that is not disjoint with respect to Tnew.

4. The communication device of claim 3, wherein the controller is further configured to associate only Anew and Ci with said new triggering rule equal to (Tnew & Ti), wherein Ci is a set of applications that was associated with Ti.

5. The communication device of claim 4, wherein the controller is further configured to add to the set of triggering rules a new triggering rule equal to (NOT(Tnew) & Ti) provided that (NOT(Tnew) & Ti) would not always evaluate to FALSE.

6. The communication device of claim 5, wherein the controller is further configured to associate only Ci with said new triggering rule equal to (NOT(Tnew) & Ti).

7. The communication device of claim 6, wherein said set of triggering rules consists of the following triggering rules (T1 ... Tn) and the controller is further configured to add to the set of triggering rules a new triggering rule equivalent to (Tnew & NOT(Tj1) & ... & NOT(Tjn)) provided that such new triggering rule would not always evaluate to FALSE, wherein Tji-Tjn are all of the triggering rules within said set of triggering rules that are not disjoint with Tnew.

8. The communication device of claim 7, wherein the controller is further configured to associate only Anew with said new triggering rule equivalent to (Tnew & NOT(Tj1) & ... & NOT(Tjn)).

9. The communication device of claim 1, wherein the controller is further configured to associate only the new application ("Anew") with the triggering rule associated with the new application ("Tnew").

10. The communication device of claim 1, wherein the controller is configured to add one or more new triggering rules to said set of triggering rules, if it is determined that the triggering rule associated with the new application is not identical to any one of the triggering rules included in said set of triggering rules and is not disjoint with respect to at least one of the triggering rules included in said set of triggering rules.

11. A method for configuring a communication device, comprising:
    storing a set of applications in the communication device;
    storing a set of triggering rules in the communication device;
    associating each said stored triggering rule with a chain of one or more of said stored applications;
    receiving a triggering rule ("Tnew") associated with a new application ("Anew"), wherein Tnew matches a request;
    determining whether Tnew is identical to any one of the triggering rules included in said set of triggering rules;
    determining that Tnew is disjoint with respect to each triggering rule included in said set of triggering rules, wherein determining that Tnew is disjoint with respect to each triggering rule included in said set of triggering rules comprises determining that each triggering rule included in said set of triggering rules does not match the request; and
    only adding Tnew to said set of triggering rules if it is determined that Tnew is not identical to any one of the triggering rules included in said set of triggering rules and is disjoint with respect to each of the triggering rules included in said set of triggering rules.

12. The method of claim 11, further comprising adding to the set of triggering rules a new triggering rule equal to (Tnew & Ti), wherein Ti was a triggering rule included in said set of triggering rules that is not disjoint with respect to Tnew.

13. The method of claim 12, further comprising associating only Anew and Ci with said new triggering rule equal to (Tnew & Ti), wherein Ci is a set of applications that was associated with Ti.

14. The method of claim 13, further comprising adding to the set of triggering rules a new triggering rule equal to (NOT(Tnew) & Ti) provided that (NOT(Tnew) & Ti) would not always evaluate to FALSE.

15. The method of claim 14, further comprising associating only Ci with said new triggering rule equal to (NOT(Tnew) & Ti).

16. The method of claim 15, wherein said set of triggering rules consists of the following triggering rules (T1 ... Tn) and the method further comprises adding to the set of triggering rules a new triggering rule equal to (Tnew & NOT(Tj1) & ... & NOT(Tjn)) provided that such new triggering rule would not always evaluate to FALSE, wherein Tji-Tjn are all of the triggering rules within said set of triggering rules that are not disjoint with Tnew.

17. The method of claim 16, further comprising associating only Anew with said new triggering rule equivalent to (Tnew & NOT(Tj1) & ... & NOT(Tjn)).

18. The method of claim 11, wherein only the new application is associated with Tnew.

19. The method of claim 11, wherein one or more new triggering rules are added to said set of triggering rules if it is determined that the triggering rule associated with Anew is not identical to any one of the triggering rules included in said set of triggering rules and is not disjoint with respect to at least one of the triggering rules included in said set of triggering rules.

20. A computer program product for configuring a communication device, the computer program product comprising a non-transitory computer readable medium storing instructions, the instructions comprising:
   instructions for receiving a triggering rule ("Tnew") associated with a new application ("Anew"), wherein Tnew matches a request;
   instructions for determining whether Tnew is identical to a triggering rule included in a set of triggering rules stored in the communication device;
   instructions for determining whether the Tnew is disjoint with respect to each other triggering rule included in said set of triggering rules, wherein determining whether Tnew is disjoint with respect to each triggering rule included in said set of triggering rules comprises determining that each triggering rule included in said set of triggering rules does not match the request; and
   instructions for only adding the Tnew to said set of triggering rules if it is determined that Tnew is not identical to any one of the triggering rules included in said set of triggering rules and is disjoint with respect to each of the triggering rules included in said set of triggering rules.

21. The computer program product of claim 20, further comprising instructions for adding one or more new triggering rules to said set of triggering rules if it is determined that Tnew is not identical to any triggering rule included in said set of triggering rules and is not disjoint with respect to at least one of the triggering rules included in said set of triggering rules.

22. The computer program product of claim 21, wherein each said new triggering rule added to said set of triggering rules is disjoint with respect to each other triggering rule in said set of triggering rules.

23. The computer program product of claim 22, further comprising instructions for adding to the set of triggering rules a new triggering rule equal to (Tnew & Ti), wherein Ti was a triggering rule included in said set of triggering rules that is not disjoint with respect to Tnew.

24. The computer program product of claim 23, further comprising instructions for associating only Anew and Ci with said new triggering rule equal to (Tnew & Ti), wherein Ci is a set of applications that was associated with Ti.

25. The computer program product of claim 24, further comprising instructions for adding to the set of triggering rules a new triggering rule equal to (NOT(Tnew) & Ti) provided that (NOT(Tnew) & Ti) would not always evaluate to FALSE.

26. The computer program product of claim 25, further comprising instructions for associating only Ci with said new triggering rule equal to (NOT(Tnew) & Ti).

27. The computer program product of claim 25, wherein said set of triggering rules consists of the following triggering rules (T1 . . . Tn) and the instructions further comprises instructions for adding to the set of triggering rules a new triggering rule equal to (Tnew & NOT(Tj1) & . . . & NOT(Tjn)) provided that such new triggering rule would not always evaluate to FALSE, wherein Tji-Tjn are all of the triggering rules within said set of triggering rules that are not disjoint with Tnew.

28. The computer program product of claim 27, further comprising instructions for associating only Anew with said new triggering rule equivalent to (Tnew & NOT(Tj1) & . . . & NOT(Tjn)).

29. The computer program product of claim 20, further comprising instructions for only associating the new application with the triggering rule associated with Anew("Tnew").

* * * * *